United States Patent [19]

Amstutz

[11] 4,345,422
[45] Aug. 24, 1982

[54] HAY-GATHERING MACHINE FOR PULLING WINDROWS, TURNING AND SCATTERING HAY

[75] Inventor: Jean-Pierre Amstutz, Birr, Switzerland

[73] Assignee: Bucher Guyer A.G. Maschinenfabrik, Niederweningen, Switzerland

[21] Appl. No.: 144,259

[22] Filed: Apr. 28, 1980

[30] Foreign Application Priority Data

May 2, 1979 [DE] Fed. Rep. of Germany ....... 2917744
Jun. 8, 1979 [CH] Switzerland .......................... 5352/79

[51] Int. Cl.³ ............................................. A01D 79/00
[52] U.S. Cl. ........................................ 56/370; 56/367
[58] Field of Search ................. 56/370, 365, 366, 367, 56/377

[56] References Cited

U.S. PATENT DOCUMENTS

| | | | |
|---|---|---|---|
| 3,975,892 | 8/1976 | Hellkuhl | 56/370 |
| 4,144,699 | 3/1979 | Aron | 56/370 |
| 4,166,352 | 9/1979 | Knusting et al. | 56/370 |
| 4,198,805 | 4/1980 | Gerlinger | 56/370 |

Primary Examiner—Robert A. Hafer
Attorney, Agent, or Firm—Holman & Stern

[57] ABSTRACT

A hay-gathering machine for pulling windrows of hay, turning the hay over, and scattering it, having a rake-wheel comprising a plurality of tine-carriers radially directed outwards from an almost vertically-pointed swivel pin, wherein the tine-carriers at their outer ends are provided with rake-tines. At the end of each tine-carrier, which is directed toward the swivel pin of the rake-wheel, there is attached at least one control lever, which, for the pulling of windrows, is connected with a first open control channel in a tensional or a form-locking, or in a purely form-locking manner. The tensional or form-locking connection of the control lever with the first open control channel is made by means of a spring or the like, while the purely form-locking engagement of the control lever into the first control channel is made by means of cooperation of the roller on the control lever with a guide way which is parallel to the first control channel. By means of a second control channel, which is displaceable in longitudinal direction to or around the swivel pin of the rake-wheel, the tines on the tine-carriers are changed into a fixed position almost vertical to the ground.

24 Claims, 17 Drawing Figures

HAY-GATHERING MACHINE FOR PULLING WINDROWS, TURNING AND SCATTERING HAY

BACKGROUND OF THE INVENTION

1. Field of the Invention

The present invention concerns a hay-gathering machine for pulling windrows of hay, turning the hay over, and spreading it with at least one rake-wheel rotating around an approximately vertical axis, having raking tines fastened to a plurality of tine-carriers which extend outwards from the swivel axis of the rake-wheel, whereby the tine-carriers in the hub of the rake-wheel are positioned rotatably about the longitudinal axis of the tine-carriers and are provided with a crank-like control lever with which is associated a control channel or cam face in a stationary position with regard to the swivel axis of the rake-wheel and equidistant thereto, controlling the rotational movement of the tine-carriers about their longitudinal axis between a lowered and a lifted position of the rake-tines.

2. Description of the Prior Art

Machines of this type are known in the art in which for the purpose of performing the various operations, the machines, especially their tine-carriers, must be adjusted by various manipulations for the positions required to perform the function.

Thus, machines have become known (Stoll, New Holland, Fella, Pöttinger) which for their universal utilization require multiple manipulations. To pull rows of hay, this machine is placed in a position so that the rake-wheel axes are directed nearly vertical to the ground, and the extending tine-carriers form an almost right angle with the rake-wheel axis.

In this position, the control levers, which are connected with the tine-carriers, directed towards the rake-wheel axis, engage a control member which is fastened to the vertical axis and has a control channel or cam face equidistant to the swivel axis of the machine.

For the purpose of changing the type of function of the machine, i.e., the changing of the machine into a position in which the hay which lays on the ground can be spread out and turned, the control lever on the tine-carriers are individually placed into such a position by means of upwards tilting by an axis parallel to the ground, so that the tine-carriers take on a tapered angle upwards pointed to the swivel axis of the rake-wheel. For this purpose, the tine-carriers are hingedly connected on the turn-over manipulator of the machine, and for the purpose of locking the machine in the position for scattering the hay they are provided with a jack-type device at the periphery of the turn-over manipulator. Following these manipulations, the machine is slightly tilted forwards in the direction of movement in a manner so that the frontal tine-carrier runs nearly parallel with the ground. Simultaneously with the upwards tilting of the tine-carrier into the position for scattering the hay a device is required which will prevent the rake-tines from tilting about the axis of the tine-carriers, since the hay-scattering is performed with rake-tines which are fixedly directed towards the ground.

The costly devices which are required for adjusting these machines make these machines more expensive.

Additionally, the upwards- and downwards-tiltable tine-carriers produce tight positions which during the resetting of the machine may cause accidents.

BRIEF SUMMARY OF THE INVENTION

It is the object of the instant invention to remove these disadvantages and to provide for a device which is low by comparison in its manufacturing costs, and by means of which, via activation of one manipulating device, all tine-carriers are placed into the desired position.

In this invention, the above problem is solved by the addition of a second control channel or cam face which is equidistant from the swivel axis of the rake-wheel and in the first position its relative position with regard to the first control channel or cam face is fixed. In this first position of the second control channel the control lever is in contact with the first control channel. In a second position of the second control channnel the control lever is lifted off from the first control channel and the second control channel is in contact with the first-mentioned control lever or with a second control lever which is provided on each of the tine-carriers.

By a respective changing and setting of the relative position of the second control channel with regard to the first control channel, the hay-gathering machine can rapidly and easily be changed from the one operating position into the other operating position. For the function of pulling windrows, the second control channel is fixed in the inoperational position, in which it permits a turning of the tine-carriers in order to lift the rake-tines upwards, and for the wide-spreading operation the second control channel is fixed in the operational position in which it prevents the tine-carriers from turning and thereby prevents lifting the rake-tines.

In one embodiment of the instant invention, the first and the second control lever are combined into a crank-like component part, and the first and the second control channels have varying diameters. The second control channel or cam face is located in a plane which is at right angles to the rotational axis of the rake-wheel, and is adjustable in the longitudinal direction of the swivel axis. By these manipulations, the axial distance between the two control channels or cam faces can be changed in such a way that they either effect or prevent a turning of the tine-carriers for lifting the rake-tines upwards.

In another embodiment of the instant invention the second control channel is structurally identical with the first control channel and is rotational with respect to the swivel axis of the rake-wheel. It is possible to thus set the phase-difference between the first and the second control channels or cam faces in a position whereby it either effects or prevents a turning of the tine-carriers for lifting the rake-tines upwards.

In a further embodiment of the invention it is possible to utilize a different counter-securing element in place of the spring means which urges the control lever into engagement with the first control channel, i.e., the form-locking or tensional control which is produced by the spring stress can be replaced by one that is purely form-locking. This can be obtained by means of a disc, where the rollers on the control levers run between the disc and the control channel or cam face.

BRIEF DESCRIPTION OF THE SEVERAL VIEWS OF THE DRAWING

Further advantageous details and characteristics of the instant invention may be seen in the following disclosure when read in conjunction with the drawings wherein.

DETAILED DESCRIPTION

Figure 1:
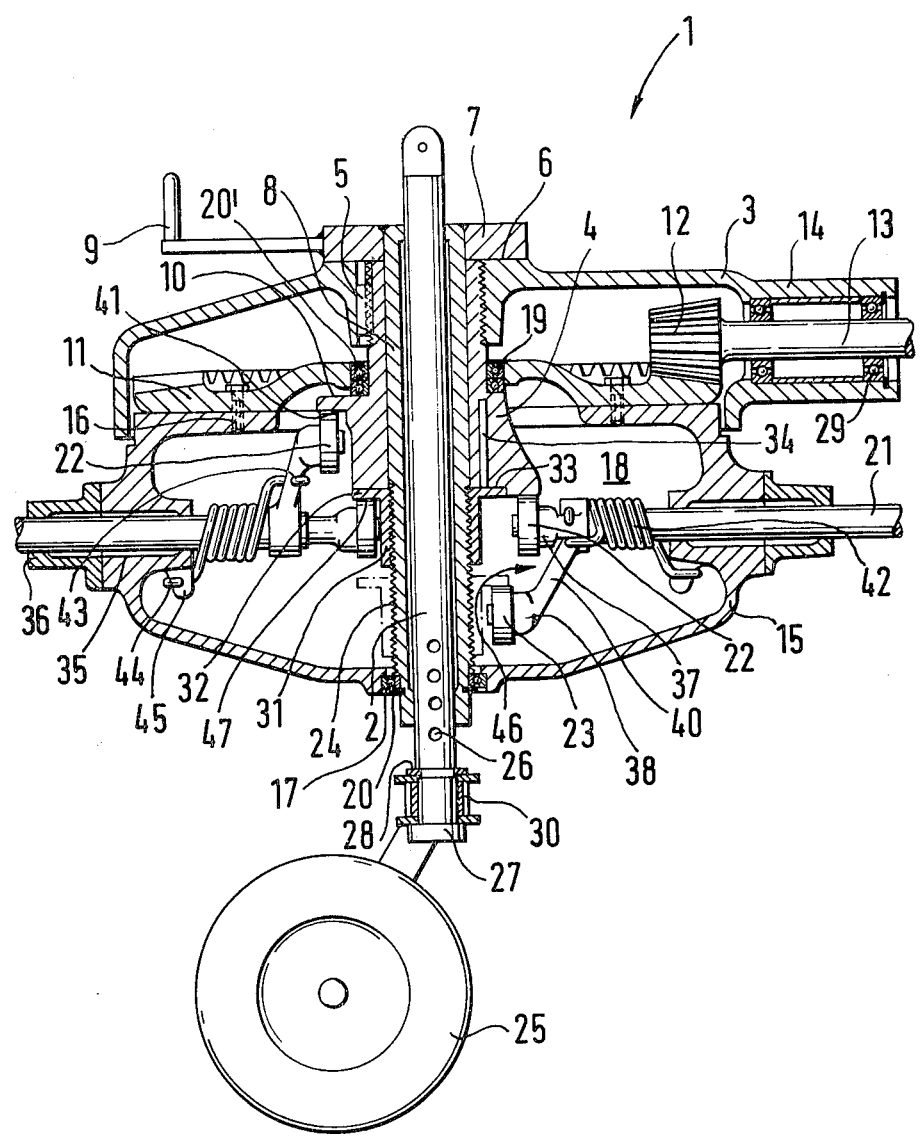
FIG. 1 shows a vertical cross-sectional view of the hay-gathering machine of this invention with an adjustable control element.

In FIG. 1, a hay-gathering machine 1 is provided with a bearing box 3, which is affixed to a vertical axis 2 which is movably supported on the ground and being connected with the tractor by means of a three-point trailer device (not shown). A control gear 4 is threadedly engaged to the inner hub portion of the upper bearing box. A key member 5 prevents relative rotation between these two components. The upper bearing box 3 and the control gear 4 form a planar front area 6, on which the annular flange 7 of a hollow axle 8 abuts rotatably. The hollow axle 8 is activated by means of a crank 9. The control gear 4 has a shoulder 10 an which is rotatably supported the bevel wheel gear 11 which is in engagement with a bevel gear 12 on the end of a drive shaft 13. The bearing 29 of the drive shaft 13 is located in a neck-shaped extension piece 14 of the upper bearing box 3.

The bearing of the bevel wheel 11 consists advantageously of an axially and a radially stressed ball bearing which accepts axial as well as radial stresses. On the bottom-side of the bevel wheel gear 11 there is fastened the rake-wheel hub 15 by means of screws 16 (shown by a broken line). The rake-wheel hub 15 is supported at its lower end on bearing 17 mounted on the lower end of hollow axle 8 and has a bowl-shaped form and together with the upper bearing box 3, forms a closed housing which protects the drive- and control-elements from foreign matter and dirt. Shaft and bearing seals 20 and 20' are provided at the bearing points 19 of the bevel wheel gear 11 and 17 of the rake-wheel hub 15 so that the hollow inner area 18 may contain a lubricant (not shown) supplied thereto in a manner so that the rollers 22, 23, which are fastened on the tine-carriers, during their operation are submerged in the lubricant. The hollow axle 8 is provided with a threaded portion 24 which extends from the bearing point 17 to the lower end of the cylindrical borehole of the control member 4. The hollow axle 8 is penetrated in vertical direction by the vertical axle 2 which is slidably supported and guided in the area of the upper and lower end portions of the hollow axle. Axle 2 is provided at its lower end portion with transverse boreholes 26 spaced longitudinally for adjusting the height of the machine whereby one of said boreholes and an aligned borehole through the lower end of the hollow axle are penetrated by a plug or pin member (not shown).

Below this device is a vertical axle 2. A rotatable support wheel 25 is secured by suitable means to bearing block 30 which is rotatably mounted on the lower end of axle 2 and retained thereon between flange 27 and a retaining ring 28 which engages in a circular slot in axle 2 to prevent it from sliding through the bearing block.

In FIG. 1, the hay-gathering machine is adjusted to pull windrows; this function is explained in more detail hereinbelow.

An internally threaded bushing 31 is screwed onto the threaded portion 24 of the hollow axle 8 to its uppermost position where its flange 32 rests on the retreated front side 33 of the control member 4, and is prevented from rotating with respect thereto by means of a pin 34 guided in a borehole of control member 4'.

By activation of crank 9, the threaded bushing 31 is thusly displaced only in the vertical direction. The tine-carriers 21 are rotatably mounted near their inner ends in axle bearing bushings 35 of the rake-wheel hub 15. For extending the length of the bearing, the bearing bushings are provided with bearing brackets 36 attached to the bearing bushings 35 as shown.

The inner end portions of the tine-carriers 21 are fastened to control levers 37 and 38 which effect the controlling of the tines. According to FIG. 1, these control levers 37–38 are constructed as an integral dual lever 46 wherein they enclose an angle of less than 90° between them. The control element 4, which is fixedly connected with the upper bearing box 3, is provided with an open control channel or cam face 41, the contact surface or cam face of said channel being directed downwards and circumferentially surrounding the vertical axle 2 at an equal distance. The rollers 22 are urged into engagement with the control channel 41 by means of springs 42 which causes the raking-tines (not shown) on the tine-carriers 21 during the rotation of the rake-wheel hub 15 to be controllingly raised from and tilted back to the ground, as is required when pulling windrows. The helical springs 42 are pushed onto the ends of the tine-carriers 21 and hook-shaped end portion 43 encircles lever arm 38 of the dual lever 46, and the other hook-shaped end 44 encircles fish plate 45 on the rake-wheel hub 15.

If it is intended to adjust the machine for the scattering of the hay-blades, then the threaded bushing 31 is displaced downwardly to the position shown in broken lines by turning the hollow axle 8 by means of the crank 9, so that the dual lever 46 changes its position, i.e., the position of control levers 37, from that which is required for pulling windrows, by releasing the rollers 22 from the control channel 41 except at its lowermost area. This position of the dual lever 46, which retains the rake-tines directed toward the ground, is seen in the drawing at the right side of the vertical axle 2 in FIG. 1 where roller 23 engages the lower face of bushing 31. Advantageously, this lowermost position of the threaded bushing 31 is determined by a boss (not shown).

Figure 2:
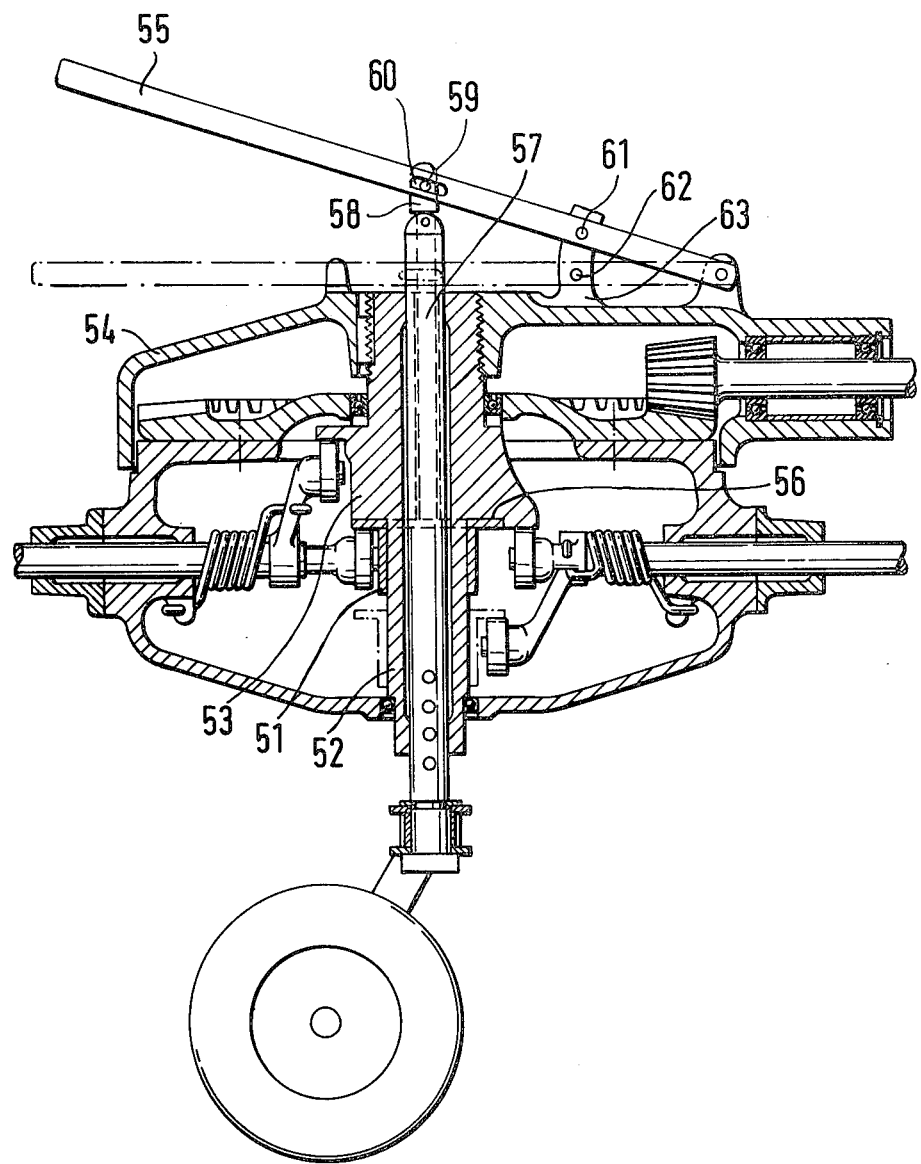
FIG. 2 is a vertical cross-sectional view of another embodiment of the invention of FIG. 1.

FIG. 2 shows a hay-gathering machine which represents a variation of the embodiment illustrated in FIG. 1. In place of a threaded bushing 31, a floating bushing 51 is used for placing the rake-tines into a fixed position. The floating bushing is axially displaced on a lower tubular section 52 of the control member 53 which is fixedly connected with the upper bearing box 54 in the same manner shown in FIG. 1. The floating bushing 51 is displaced in the vertical direction by means of a lever arm 55 which is pivotally mounted on the upper bearing box 54. For this purpose, the front side 56 of the floating bushing is provided with at least two rods 57 positioned opposite to each other and which in the vertical direction extend through the control member 53, and each having at its upper end a rod-head 58. A pivot pin 59 extends through the rod heads and through a slot 60 of the lever arm 55. The device as illustrated in solid lines shows the machine in the position for pulling windrows while the broken lines represent the machine in a position for scattering (wide-spreading) the hay. For fixing the position of the machine in either position a bolt (not shown) is inserted through aligned holes 61, 62 on lever arm 55 and cross-piece 63, respectively.

Figure 3:
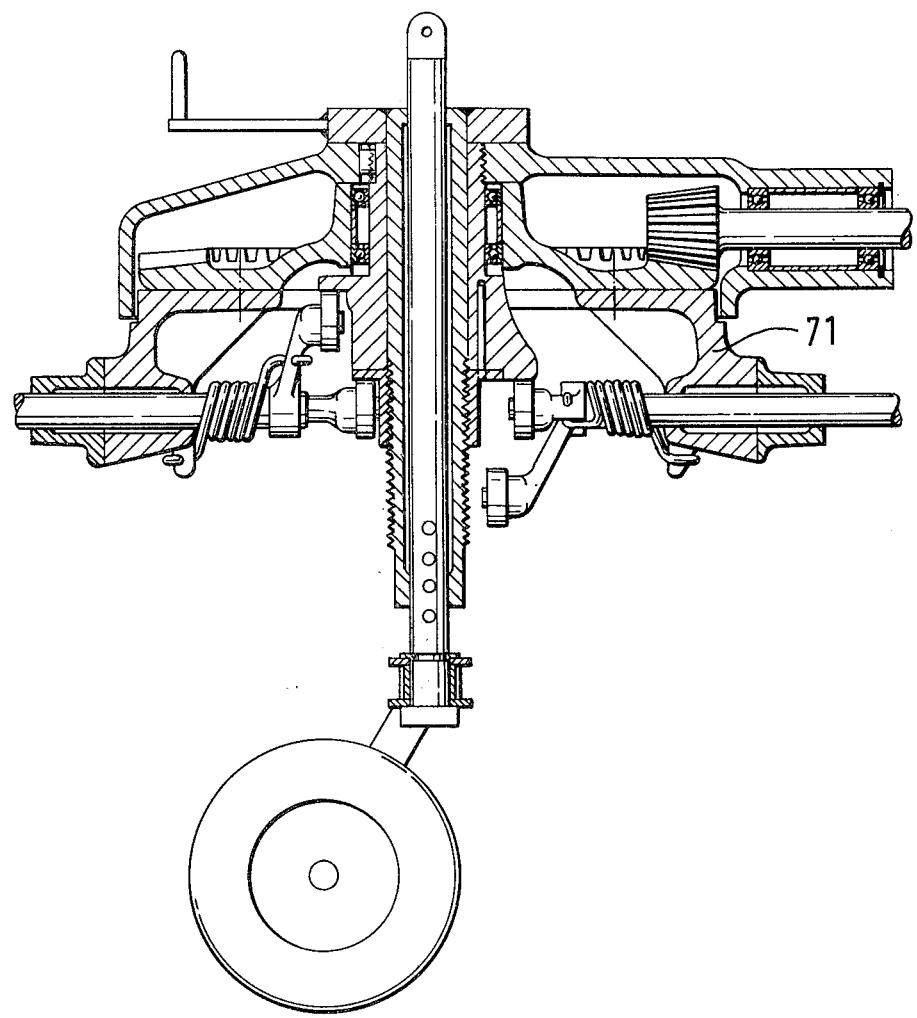
FIG. 3 shows a vertical cross-sectional view of a machine according to FIG. 1 with some parts omitted and being open towards the ground.

FIG. 3 shows an embodiment of the hay-gathering machine according to FIG. 1 but wherein the lower portion of the rake-wheel hub 71 has been omitted so the control lever mechanism is open towards the ground. This embodiment has the advantages of being easier to manufacture and lighter in weight.

Figure 4:
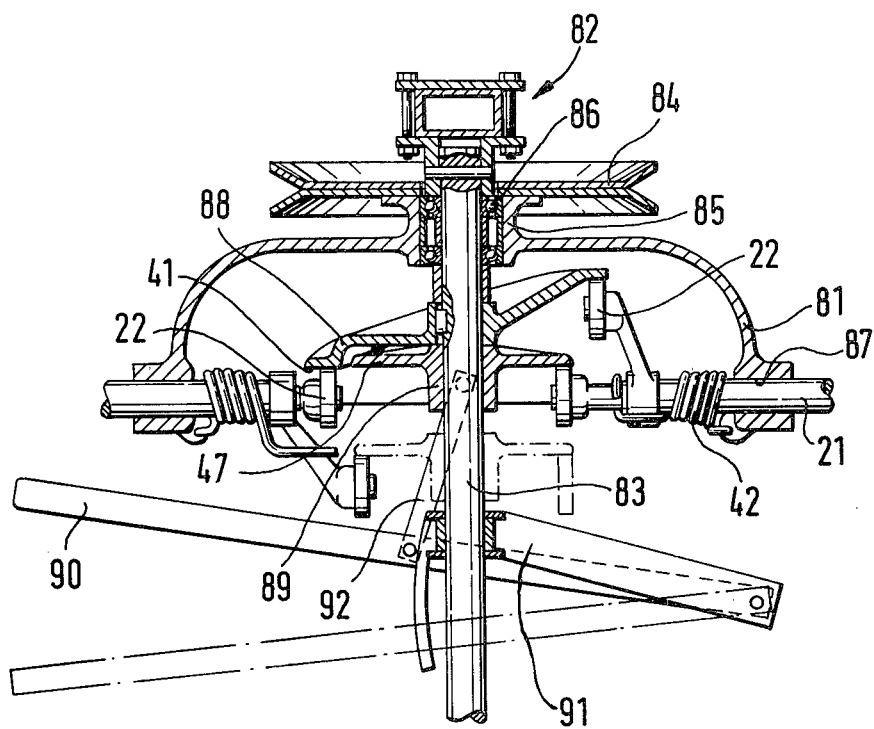
FIG. 4 shows a cross-sectional view of a different embodiment of a hay-gathering machine having an adjustable control member.

The hay-gathering machine according to FIG. 4 is an alternative embodiment of the invention, the difference being that the hub-shaped rake-wheel 81 rotates around a fixed vertical axis 83 which is fixedly connected with the machine frame 82, and is activated by means of a drive pulley 84 which is fastened to the neck 85 of the rake-wheel 81. Inside the neck is located the bearing 86 of the rake-wheel 81, which receives vertical as well as also radial stresses. At the lower outer peripheral portion of the rake-wheel 81 are provided axle bearing bushings 87 for the tine-carriers 21, the control levers and rollers 22 of which analogous to the above-mentioned embodiments are urged under the pressure of helical springs 42 into engagement with the control channels or cam faces 41, 47 which control their rotatable positions. For this purpose control member 88 is fastened to the vertical axis 83 while the planar control channel or cam face 47 of the control disc 89 is displaceably mounted on the vertical axis 83. For the operation of wide-spreading (scattering), the control disc 89 is moved downward to the position shown in broken lines until it reaches a boss member by means of lever 90 pivotally mounted on a support means 91 which is fastened to the vertical axis 83 at least in such a manner so that the rollers 22, which are required for controlling the pivoting of the rake-tines, barely contact the lowermost position of the control channel 41. For transmitting the adjusting movements, a rod 92 is pivotally connected at its ends to the lever 90 and the control disc 89. The broken line denotes the position of lever 90 and control disc 89 which is required for the scattering (or wide-spreading) operation.

Figure 5:
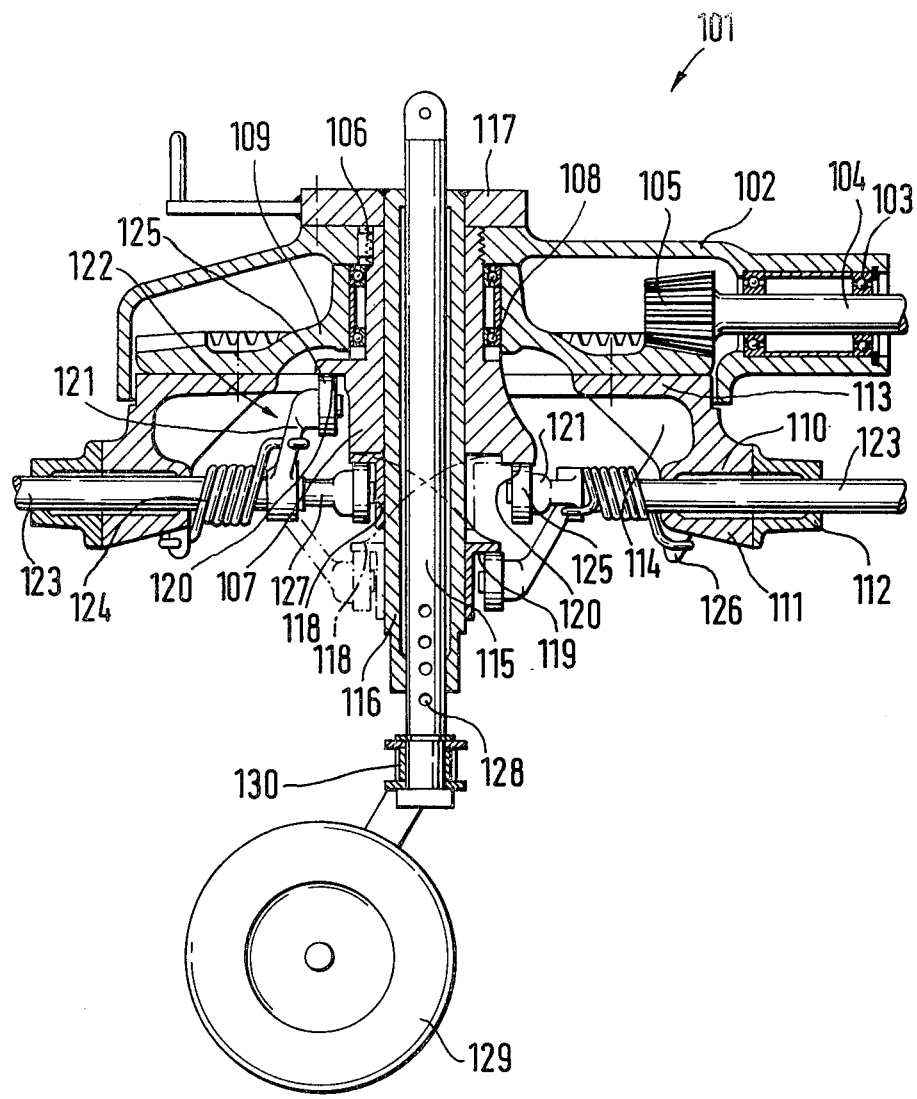
FIG. 5 shows a cross-sectional view of a hay-gathering machine similar to the one illustrated in FIG. 1, but having a rotationally-adjustable control device.

In the embodiment of the hay-gathering machine shown in FIG. 5, it is intended to adjust the machine from the position for pulling windrows to the position for wide-spreading (or scattering) in a different manner. A hay-gathering machine, denoted here throughout with numeral 101, is provided with a housing portion 102 which is connected with a tractor, in which the bearing 103 of a drive shaft 104 and the bevel pinion 105 are located in said housing. The control member 107 is threadedly connected to the housing portion 102 (as in the embodiment of FIG. 1) and is prevented from turning by means of key 106, said control having mounted thereon the bearing 108 of the inner hub of the bevel wheel gear 109 which is in engagement with the bevel pinion 105. To the lowermost part of the bevel wheel gear 109 is fastened the rake-wheel hub 110, which at its peripheral axel bearing bushings 111 supports the inner ends of the tine-carriers 123. The bushings 111 are lengthened by means of additionally-provided bearing bushings 112 attached thereto. In order to improve the stability characteristics, the coupling flange 113 of the rake-wheel hub 110 is connected with the axle-bearing bushings 111 with reinforcing ribs 114. Between the vertical axis 115 and the control member 107 is disposed a hollow axle 116 which has fixedly attached thereto at its upper end a crank 117. Between its ends a control bushing 118 is abutting the bottom end of the control member 107. The control bushing 118 is fixedly connected with the hollow axle 116 and its control channel or cam face 119 is identical with the control channel or cam face 120 of control member 107.

For order sake of completedness, it should also be mentioned that the machine is built to be adjustable in its height by means of the holes 128 which are provided at distances apart from each other on the vertical axis 115, and that the support wheel 129 is attached to the support member 130 which is affixed to the lower end portion of the vertical axis 115 so as to be freely pivotable as described above in connection with the embodiment of FIG. 1.

The hay-gathering machine illustrated by solid lines is shown in the working position for pulling "windrows", i.e., the rollers 125 on lever 121 of the dual-arm lever 122 on the inner end portion of the tine-carriers 123 is urged into engagement with the control channel or cam face 120 of control member 107 by means of the torsion springs 124. The torsion springs 124 are pushed over the tine-carriers 123 and their hook-shaped ends encircle a fishplate 126 on the axle-bearing bushings 111 and an arm 121 or 127 of the dual lever 122.

Should the machine be utilized for wide-spreading (scattering) then the crank 117 is turned by 180° so that the control channels 119, 120, which are positioned above each other, are moved towards each other in a manner so that there is no longer a control of the tines, i.e., the latter are fixedly directed toward the ground. The crank 117 is rotatable by 360°, whereby its rotational direction may be randomly selected. The position of the control bushing 118 shown by the broken line indicates the wide-spreading position of the machine and shows that the control bushing 118, which is turned by 180°, has released the left roller 125 from the control channel 120, while the right roller 125 abuts on the control channel 120 of control member 107.

Figure 6:
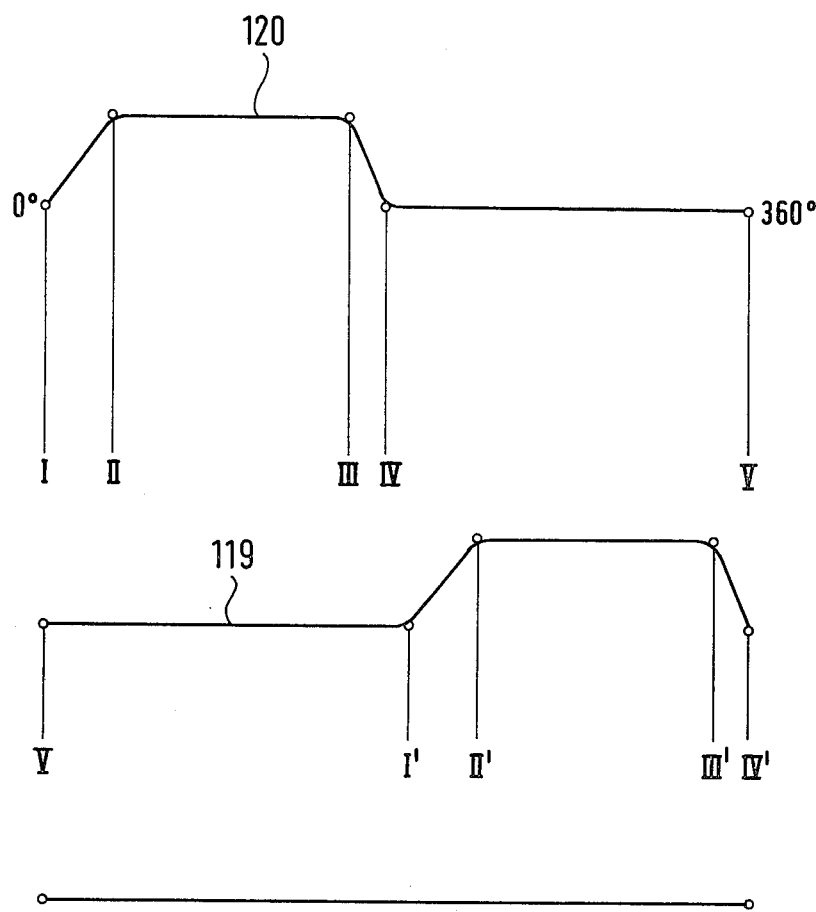
FIG. 6 is a schematic illustration of the control device of FIG. 5.

For a better understanding of the kinematic connection, the wide-spreading process is schematically illustrated in FIG. 6 where the control channels or cam faces 119. 120 represent the function.

Beginning at a 0°-position of the control channel or cam face 120, the beginning of the tine-lifting is illustrated by the line increasing in height from I to II. From II to III, the rake-tines are moved outwards to their maximum, which in practice corresponds with a circular sector on the cam face of approximately 115°. From III to IV, the tines are moved into the raking position whereby the circular sector for raking from IV to V amounts to more than 180°. This is because after turning of the control disc 118 by 180°, there can not exist a void between the control channels or cam faces located one above the other.

In the straight line configuration of the two control channels or cam faces 119 and 120, shown at the bottom of FIG. 6, the two levers 121 and 127 relative to the swivel pin of the tine-carriers 123 are constantly retained in an angular position which corresponds with the lowered position of the tines.

When the cam 119 with regard to the illustration seen in FIG. 6 is turned by 180°, then its phase displacement with regard to the cam 120 is voided. The cam 119 has therefore the same effect as the cam 120 with regard to the angular position of the tine-carriers 123.

Figure 7:
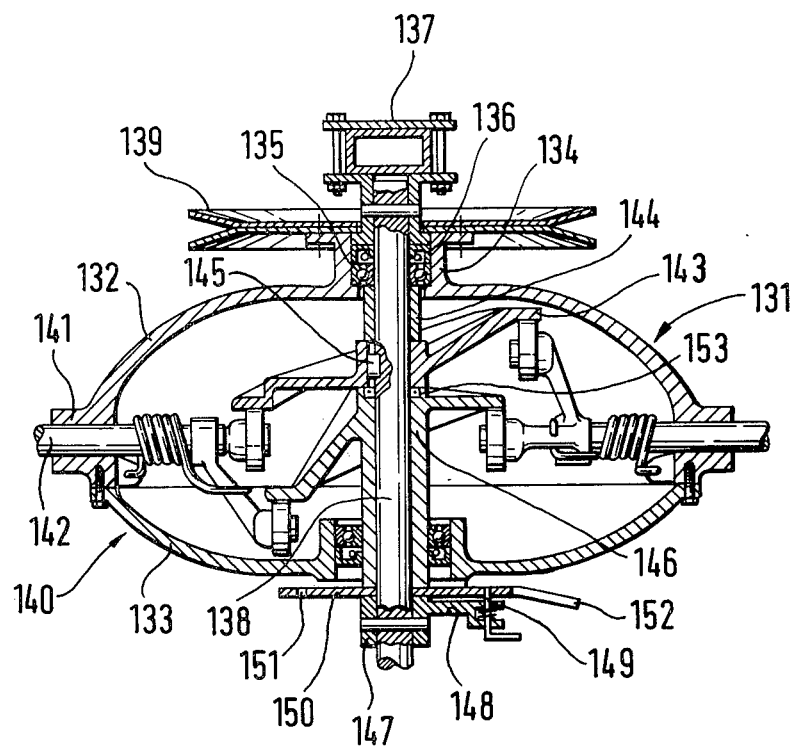
FIG. 7 shows a cross-sectional view of another embodiment of the invention seen in FIG. 5.

FIG. 7 shows a hay-gathering machine which is provided with a rake-wheel hub housing 131 comprising an upper housing portion 132 and a lower housing portion 133. Both housing portions are secured to each other by means of screws (not shown). The upper housing portion 132 has a bearing neck 134 in which is located an upper roller bearing 135 and gasket 136. A similar lower bearing and gasket and also provided in the corresponding bearing neck of the lower housing portion. The vertical axis 138 which is fixedly connected with the machine frame 137, is supported on a wheel (not shown) as previously described. On the bearing neck 134 is fastened a drive pulley 139 by which is activated the rake-wheel 140 (only partially shown). In place of the drive pulley, there may also be utilized a miter gear. According to the illustration, the axle-bearing bushings 141 of the tine-carriers 142 are disposed in the upper housing portion 132, but they could as well be provided in the lower housing portion 133. The control member 143 with key 145 is affixed to the vertical axis 138 by means of bearing spacer 144 at a distance from the inner wall of the upper housing portion 132. A rotatable control disc 146 bears on the vertical axis 138 and, by means of a socket joint 147 is immovably arranged with respect to its height position. A support 148 is provided with a plug member 149 which engages in one of two holes 151 provided on an adjusting disc 150 attached to control disc 146 and is retained therein under the force of a spring. The control disc 146 is manually adjusted by means of handle 152 on the adjusting disc 150. In order to retain the oil within the housing in a sealed condition, the control disc 146 is provided with a sealing gasket 153 which prevents the oil from leaking at the vertical axis 138. It is not necessary to further discuss in detail the function of this embodiment since the explanations given with regard to the embodiment shown in FIG. 5 apply here as well.

In the case where the hay-gathering machine comprises a plurality of rake-wheels, a central manipulator device should be utilized for switching the machine to the required function.

Furthermore, the distance of the rake wheels should be variably adjustable, i.e., in addition to the overlapping of the rake circle, the width of the formation of the windrows should be adjustable according to the working conditions, namely, a smaller or a wider windrow.

Figure 8:
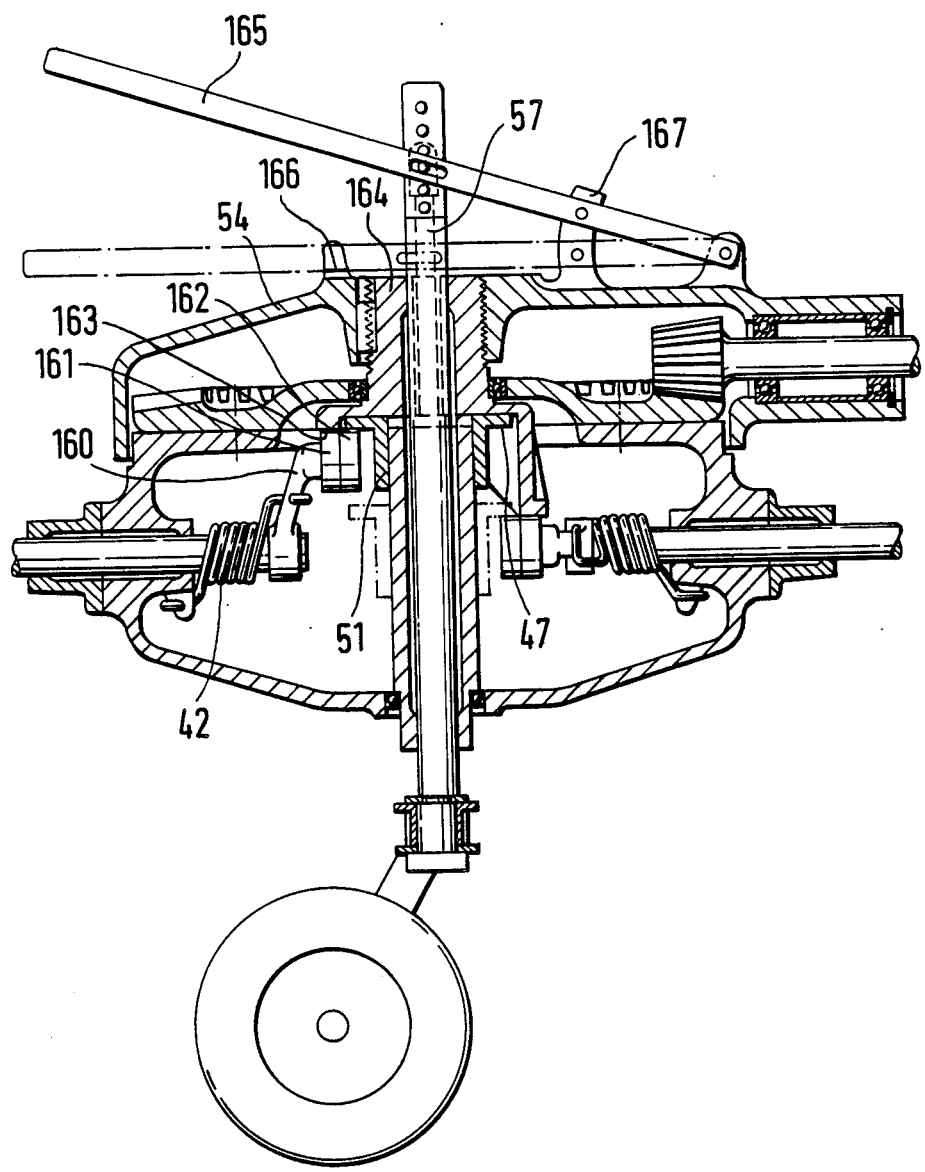
FIG. 8 is a cross-sectional view similar to that seen in FIG. 1, but showing another embodiment of the conntrol device.

FIG. 8 represents a hay-gathering machine in which the first and the second control lever, for performing the operation of wide-spreading (scattering) and for pulling windrows, are combined into a crank-like structure 160. The structure 160 is provided with two similar rollers 161, 162, whereby the roller 161, by means of a torsion spring 42, is pressed against the control channel 163 of the control member 164 which is fixedly connected with the upper bearing box 54. In this position, the machine takes on the windrow-pulling setting, which is obtained by pulling the lever 165 upwards. This change of function is made after the machine has been slightly raised by means of the towing control rods on the tractor.

However, when the machine is constructed to be pulled, i.e., it is connected with the tractor at the field-guide rail and supports itself with its wheels on the ground, there is an additional device utilized, such as a spindle-drive, hydraulic cylinder, or the like, as known in the art, for raising the machine.

When the machine, which is attached to the towing control rods, after pulling windrows is to be changed into the scattering position, then it will have to be raised off the ground at least to an extent that the lever 165 can be lowered from its upper position in a manner so that it rests on the bearing point 166, and is secured in this position by means of a plug or similar device. By tilting the lever 165 downwards, the floating bushing 51, which on the lower end of its flange is provided with a planar control channel or cam face 47 and being connected to the lever 165 by means of a rod 57, is moved into its lower position shown in broken lines. With this movement, the roller 161 leaves the control channel or cam face 163, while the roller 162 is pressed against the control channel or cam face 47 of the floating bushing 51 by means of torsion spring 42.

It is also possible to equip the machine with a rotatable control bushing according to FIG. 5. The roller 162, which is positioned on the crank-like structural component 160 and which faces the rake-wheel axle, would then be associated with the control channel 119 of floating bushing 118, and the roller 163 would be associated with the control channel 120 of control member 107.

Figure 9:
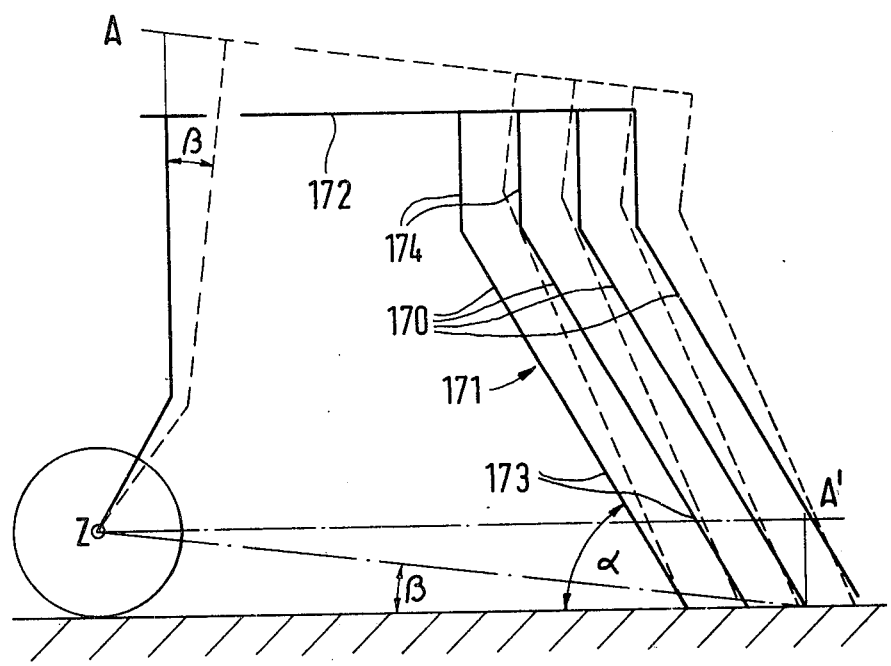
FIG. 9 is a schematic illustration of the arrangement of rake-tines.

FIG. 9 schematically shows an embodiment of the rake-tine arrangement for the scattering and the turning of hay as well as for forming rows of hay (pulling windrows). The schematically illustrated crosscut of a machine shows by means of the solid lines the position for forming rows of hay. The raking member 171 comprising four raking tines 170 which are bent outwardly at an angle, is mounted on a tine-carrier 172 rotating in a plane which is almost horizontal to the ground. The lower portions 173 of the rake-tines 170 form with the ground a sharp angle α, while the tine-roots 174 form an almost right angle with the tine-carrier 172. But for the outermost rake-tines, all remaining rake-tines reach almost to the ground.

Since the rake-wheel for scattering the hay which lays on the ground has to be slightly tilted forward in order to become more effective, the rake-wheel of this type of machines is slightly raised before it is being tilted, namely, in a manner so that in the final scattering position the outermost rake-tines almost touch the ground, while the rake-tines which are closer to the swivel pin of the rake-wheel are at a greater distance to the ground (broken line).

Based on the position for raking rows (pulling windrows), the machine at first has to be raised up to line A. At A', the height of the rake-tines extends to the ground. After this movement, the machine is turned about the support wheel axle Z with the rake-tines pointing toward the ground so that the outermost two rake-tines push with their tips to the ground, the inner rake-tines are moved away from the ground. The angle β corresponds with the rake-angle of the machine.

Figure 10:
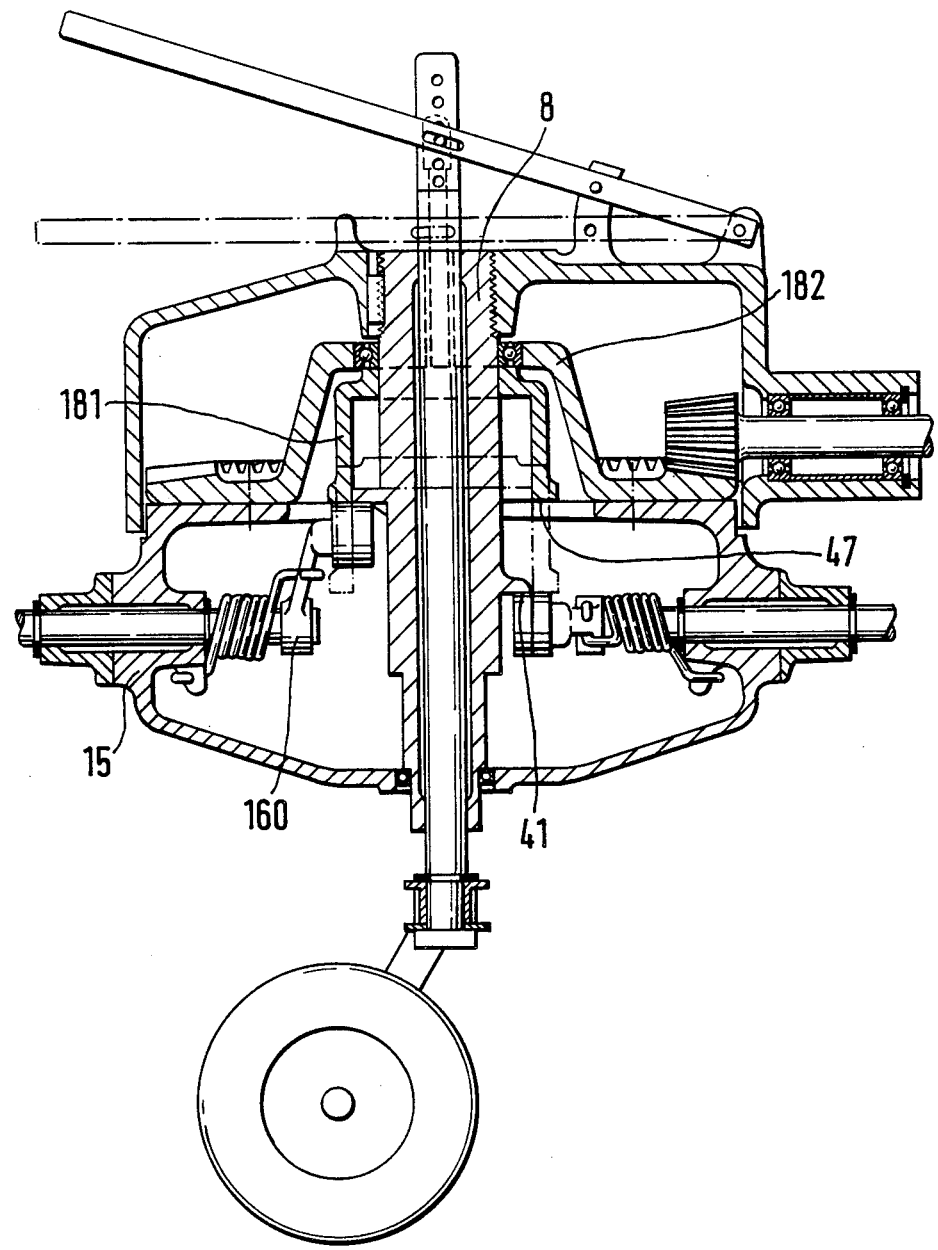
FIG. 10 is a cross-sectional view similar to that seen in FIG. 1, but showing still a further embodiment of the control device (manipulator)

FIG. 10 illustrates a hay-gathering machine which also is provided on its tine-carriers with one each crank-shaped structural part 160 having two rollers positioned side-by-side on the same axle. Compared with the above-described embodiments, the control channel or cam face 41 required for the guiding of the tines is here provided on the hollow axle 8 and the planar control channel 47 is vertically displaceable on floating bushing 181. This control variant requires a bell-shaped structure of the floating bushing 181 which has the control channel or cam face 47 on its lower end. The bevel gear wheel 182 which bears on the hollow axle through a bearing as previously shown and which carries the rake-wheel hub 15, is structured according to this embodiment as shown.

Figure 11:
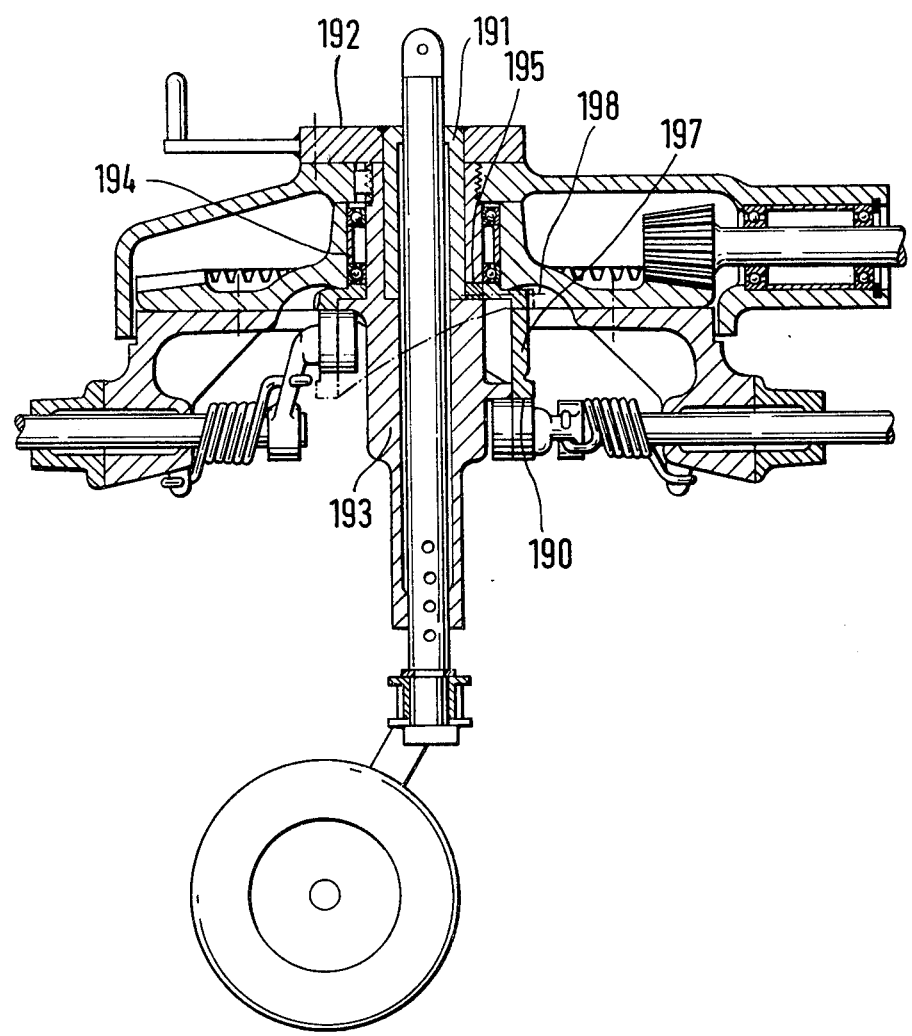
FIG. 11 is a cross-sectional view similar to the one seen in FIG. 5, but with another embodiment of the control device.

In FIG. 11 is illustrated a hay-gathering machine comprising an outer control channel or cam face 190 which is rotatable about the pivot pin of the rake-wheel. Functionally, this construction is close to that seen in FIG. 5 but with the difference that the outer control channel or cam face 190 can be rotated by means of a cylindrical auxiliary element 191 on which is arranged a crank 192. This embodiment has a relatively higher manufacturing cost since the hollow axle 193 for receiving the cylindrical auxiliary element 191 is provided with a borehole 194 which is coaxial with the pivot pin and near the borehole 194 is provided with a radial annular slot of at least 180° through which extends a carrier plate 195 which is connected at its outer end to control bushing 197. The broken line 198 indicates a screw penetrating the control bushing 197 and the carrier plate 195 and screwed into the cylindrical auxiliary element 191.

Figure 12:
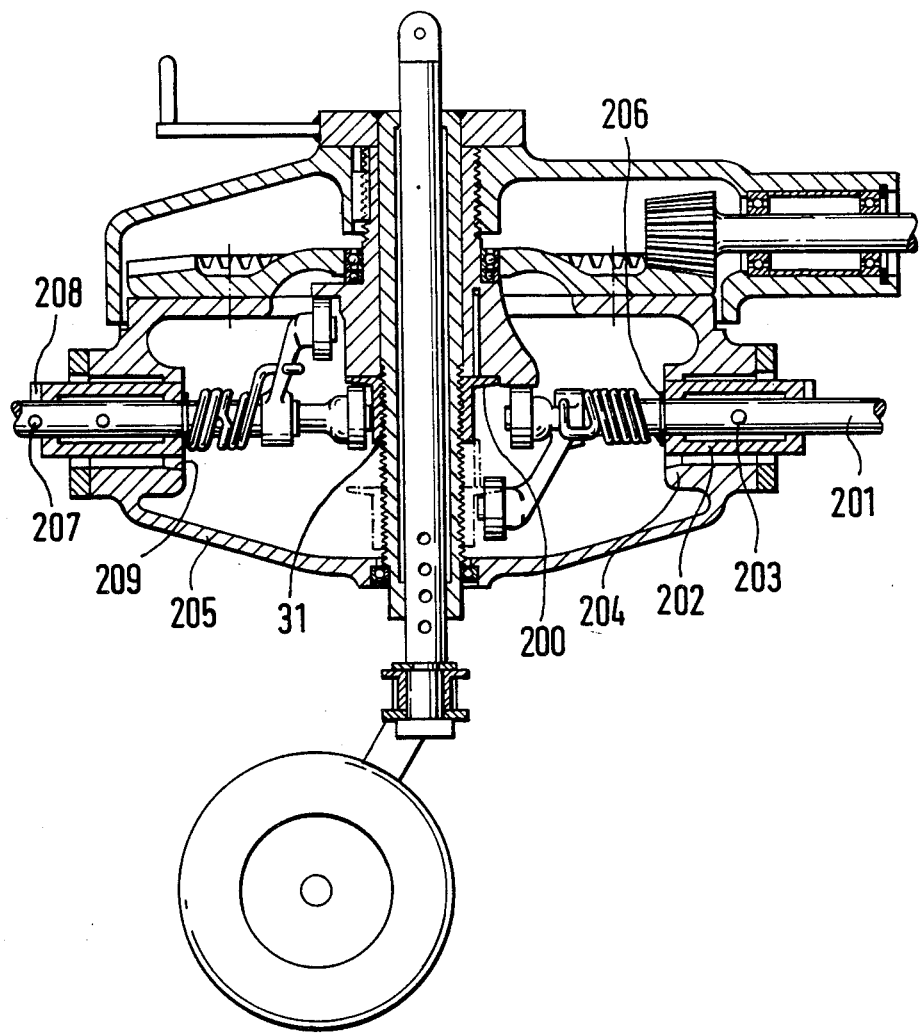
FIG. 12 is a cross-sectional view similar to that seen in FIG. 1, wherein a pivotable positioning of the tine-carriers is shown.

FIG. 12 shows a further embodiment of a hay-gathering machine for pulling windrows and scattering, or turning of hay. It shows especially for scattering a device for rasing the tine-carriers in a manner so that they obtain a sharp upwards angle toward the rake wheel axle, in a manner as practiced by the prior art rotary scattering/turning machines, i.e., the machine can thereby obtain a position which is most favorable for the scattering operation. In order to be able to obtain this position, the axle-bearing bushings of the tine-carriers 201 are pivotal bushings 202 which at their periphery contain radially projecting pivot pins 203 which penetrate the bearings 204 at the rake-wheel hub 205 in a horizontal direction. The tine-carriers 201 are secured in the pivotal bushings 202 by means of retaining rings 206 at both ends of the bushing. Alternatively, as seen in the drawings, radially projecting pins 207 may be mounted on the tine-carriers at the outer end portion of the pivotal bushings 202 in order to define the pivotal area of the tine-carriers by means of boss members 208 which are provided on the outer ends of bushings 202, for the embodiment wherein the threaded bushing 31, during the lowering, could displace itself too far downwards, whereby the tines would obtain an undesirable position towards the ground. In order to enable the tine-carriers to tilt upwards, the bushings 202 are associated with a slanted area of incidence 209. To guarantee an efficient operation, the underside of the flange of bushing 31 forming the cam is of a conical shape. In general, also in this embodiment a torsion spring presses the roller onto the cams as previously described. If a torsion spring, which over its entire length has a constant wire gauge, should be unable to produce the desired pressure for pressing the rollers onto the cams, there could then be utilized a partially reinforced spring.

Figure 13:
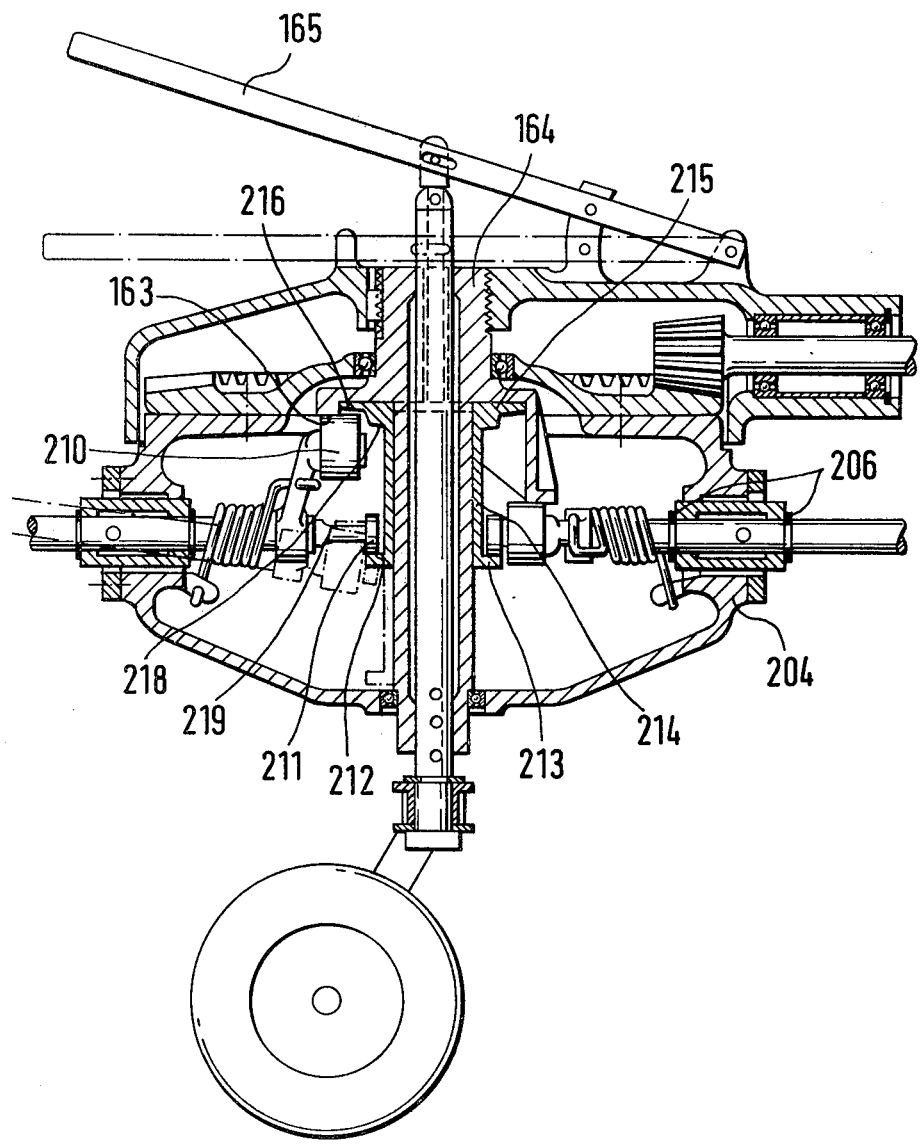
FIG. 13 is a cross-sectional view similar to that seen in FIG. 2, wherein a pivotable position of the tine-carriers is shown.

FIG. 13 shows an embodiment similar to the embodiment of FIG. 8 but differs in that instead of two rollers positioned adjacent each other, there is utilized a wider roller 210 which during the row-raking (pulling windrows) is pressed onto the control channel or cam face 163 of control member 164. In order that during the windrow-pulling the tines are prevented from being raised into the position for scattering the hay due to their stress or contact with the ground, each tine-carrier is provided at its inner end portion with an extension piece 212 having a support roller 211 thereon which has a roller path 212 formed by an annular shoulder 213 on the lower end of control bushing 214. Should the machine now be changed into the hay-scattering position, then the control bushing 214 is pushed downwards by means of lever 165. During this movement, the wide roller 210 is pressed onto the control channel or cam face 216 on the upper flange 215 of the control bushing, while a control channel or cam face 218 on the upper flange 215 of the control bushing adjacent 216 supportingly retains the support roller 211 in the hay-scattering position. The tine-carriers 201 are shown as analogous to FIG. 12. A pivotal boss member 208, as shown in FIG. 12, is not required in the embodiment seen in FIG. 13, since the rollers 210, 211, resting on the control channels, will provide for a limited movement of the tines. A downwardly open form of the rake-wheel hub could also be used to simplify the construction and manufacturing process of this embodiment.

Figure 14:
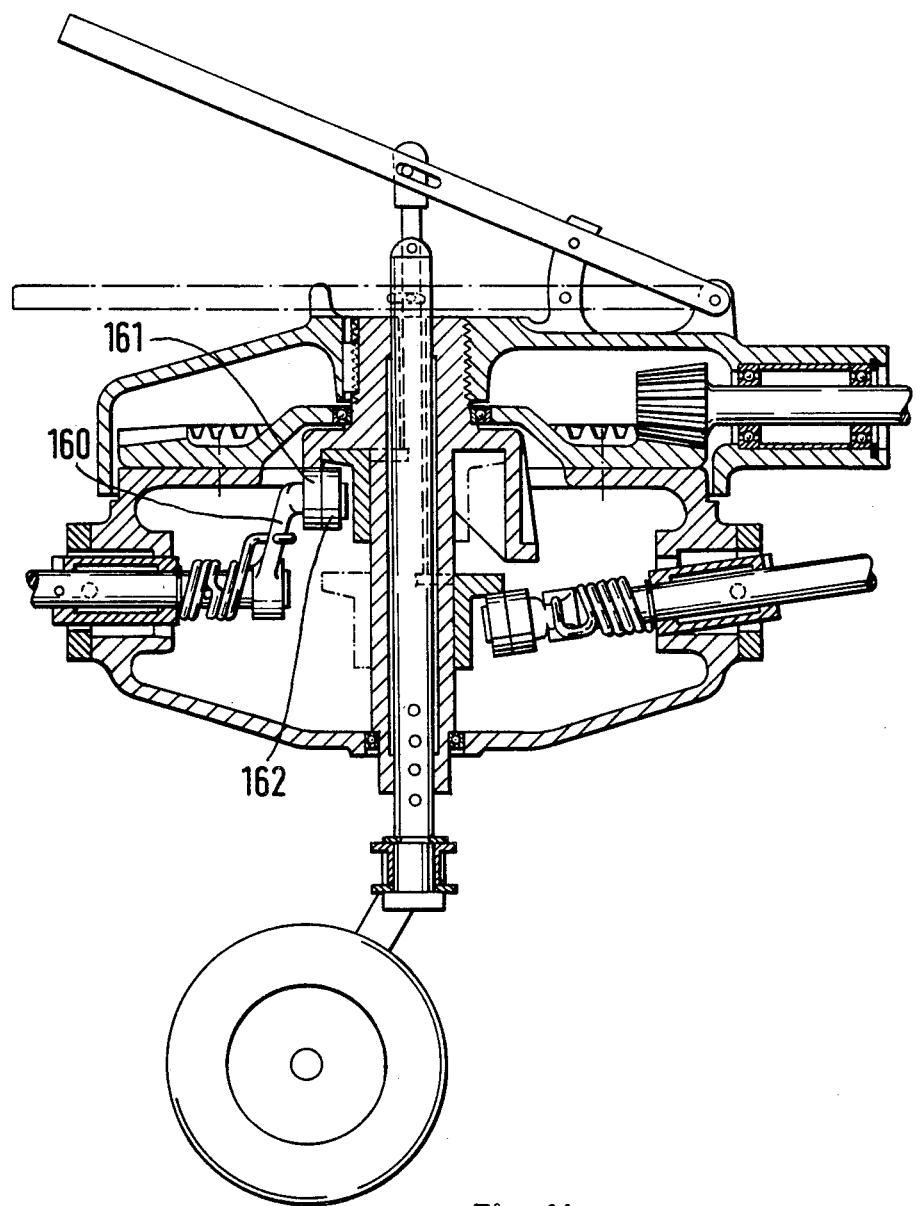
FIG. 14 is a cross-sectional view similar to the one seen in FIG. 8, wherein a pivotable positioning of the tine-carriers is shown.

FIG. 14 shows an alternative form of the embodiments shown in FIGS. 8 and 13, whereby analogous to FIG. 8 it has the characteristic feature of the lever with rollers adjacent each other, and analogous to FIG. 13 the high-pivotable axle-bearing bushings.

Figure 15:
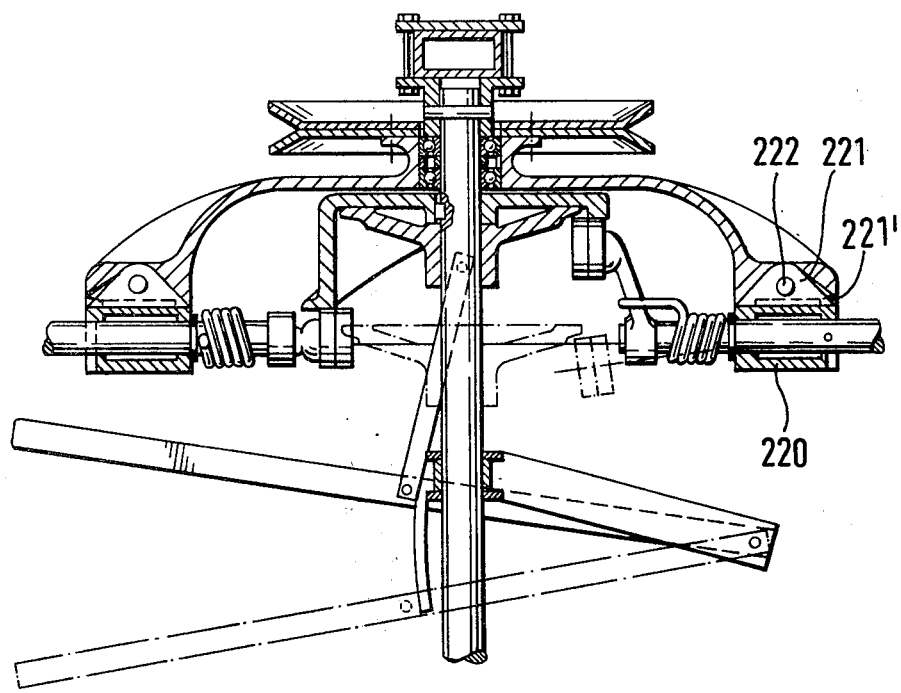
FIG. 15 is a cross-sectional view similar to the one seen in FIG. 4, wherein a pivotable positioning of the tine-carriers is shown.

A downwardly open rake-wheel hub would be easily realized and is seen in FIG. 15. The axle-bearing bushings differ from those seen in the preceeding figures in that a different suspension of the bearing bushing 220 is provided. The rake-wheel hub, on its periphery in the area of the tine-carriers, is enlarged to support the bearing bushing 220 which in this case has a triangular rib 221 pivotally mounted within a alot 221 in said enlarged area by a pin 222 extending therethrough.

Further advantages of this control system are disclosed hereinbelow.

By utilizing a torsion spring for pressing the rollers of the control levers onto the control channels or cams, the tine assembly has a certain elasticity and can therefore avoid damage when encountering foreign matter on the ground.

Figure 16:
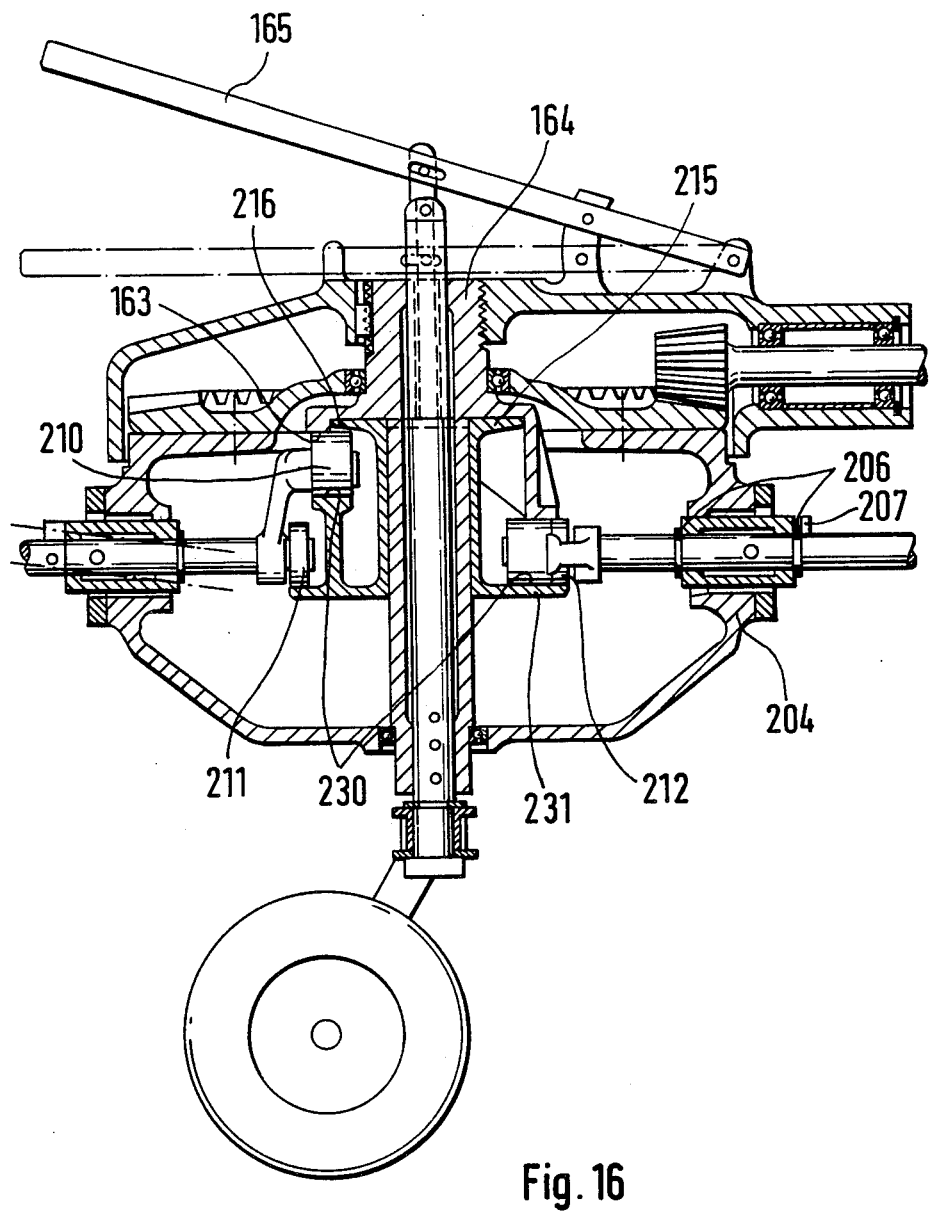
FIG. 16 is a cross-sectional view similar to the one seen in FIG. 13, showing a different embodiment wherein in place of the spring-loaded control levers a purely form-locked control is made by means of a disc.

FIG. 16 shows an embodiment which is similar to that seen in FIG. 13, which, however, differs therefrom as follows: the support roller 210 on the first control lever is no longer retained against the first control channel or cam 163 of the member 164 with the aid of a torsion spring placed on the tine-carriers, but it is guided in a form-locking manner between the control channels or cams 163, and a guide way 230. This guide way 230 is parallel to the control channel or cam 163, and is opposite the same in a manner so that together with the control channel 163 it forms a slot for receiving the roller 210.

The guide way 230 is formed on a disc-shaped portion 231 on the control member 215 which can be displaced along the swivel pin. In the embodiment shown, the portion 231 is a component part of member 215 which is provided with the second control channel 216. The connection of the portion 231 provided with the guide way 230 and the portion provided with the second control channel or cam 216, is made via the bushing portion of member 215 cylindrically encircling the swivel pin.

This connection, however, is not necessary. It is also possible to construct the portion 231 with the guide way 230 in a manner so that it is simply driven to the first control channel or cam 163 for the mandatory attachment of the first control lever to the first control channel or cam 163, but in a second position it enables the separation of the support rollers at the end portion of the control levers from the first control channel or cam and enables contact with the second control channel or cam.

It is the task of the guide way 230 to retain the support rollers which are arranged at its end portions on the control channel or cam. The guide way 230 takes over the function of the torsion spring which in the embodiment according to FIG. 13 retains the support roller 210 on the control channel 163 and thus during the pulling of windrows effects the outward-lifting of the tines. In addition to the guide way 230, the portion 231 is provided with an extension piece 212 for the support rollers 211, which in this manner during the raking of rows are prevented from performing a delivery movement of the type seen in FIG. 16 at the left, as indicated by the broken line. For this purpose, the portion 231 is constructed as a type of disc on which the swivel axis stands vertical and which on its upwards-pointed side, namely facing the control channel 163, is provided at its periphery with the extension piece 212, while the guide way 230 is located somewhat further inwardly.

If, with the aid of lever 165, the upper flange 215 with the second control channel 216 is being lowered, then simultaneously also the guide way 230 is moved from the first control channel or cam face 163 downwards so that now the tine-carriers are able to tilt away downwards in the position shown by the broken line, and the planar control channel or cam face 216 moves the rollers 210 with it in the downward direction. This is the position for scattering the hay in a manner as explained in more detail above with regard to the embodiment seen in FIG. 13. For spreading of hay, the rake wheel is tilted into the direction the machine is being driven.

It should explicitly again be pointed out here, that the guide way 230 runs parallel to the first control channel or cam 163 at a distance which corresponds approximately with the diameter of roller 210 on the first control lever, in contrast to the second control channel 216 which is a planar control channel and not parallel to the first control channel 163.

Figure 17:
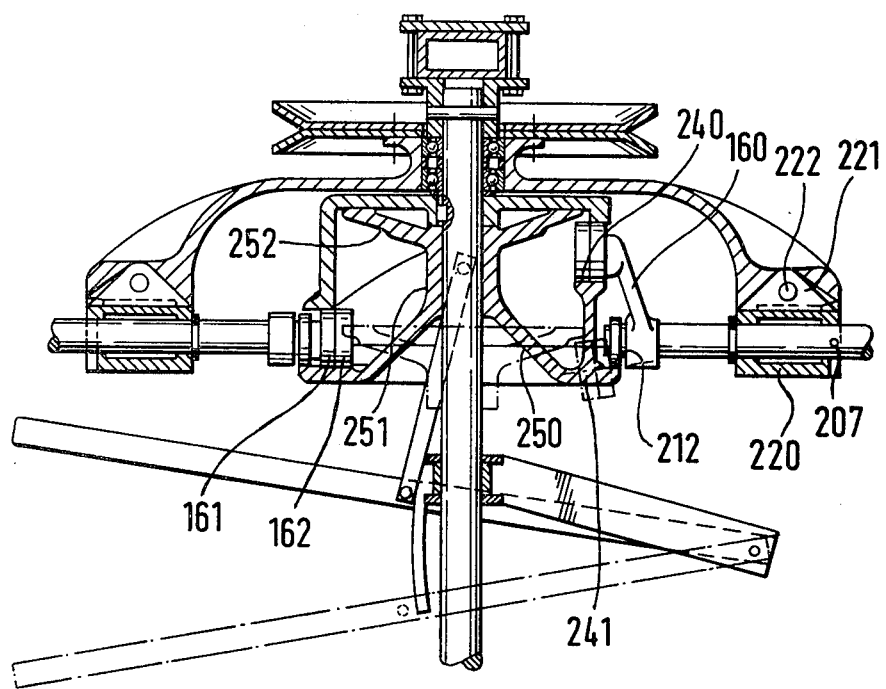
FIG. 17 is a cross-sectional view similar to the one seen in FIG. 16 wherein the wheel-hub housing is open towards the ground.

FIG. 17 shows an embodiment similar to that seen in FIG. 15 but deviates in its construction therefrom in a similar way as the embodiment of FIG. 16 differs from the construction of FIG. 13. There are no torsion springs on the tine-carriers. Instead, the abutment on the first control channel or cam of the rollers 161 and 162, which are carried by the end portion of each control lever 160, is secured by means of a guide way 240, which, similar to the manner explained above with regard to FIG. 16, is arranged within the outer periphery of a circular discshaped portion 241 on that outer periphery of the control member, whereby the outer edge 212 of said portion 241 serves as a roller path for the support rollers which during the raking of rows of hay prevent the tine-carriers from tilting.

The control member as seen in FIG. 17 is constructed somewhat cross-shaped as viewed in cross-section. The lower portion consists of a conically shaped portion 250 which carries the circular ring disc with guide way 240 and the roller path 212 for the support rollers, the conical portion itself being attached to a bushing member 251 from which at its top a flatter conical portion 252 projects, has on its outer periphery the second control channel or cam. The device functions in general in a manner as already explained above with regard to FIG. 15.

In FIG. 16 as well as in FIG. 17, there are radially projecting pins 207 fastened on the tine-carriers in the area of the bearing bushings 202, which prevent the tilting of the tine-carriers about their axis during the scattering operation, i.e., by means of the devices which have already been explained with regard to FIGS. 12 and 13, the tines during the scattering of hay are fixedly and almost vertically directed to the ground.

Furthermore, it is possible, by means of adjusting the control bushings in an interim position—this holds true however only where there is vertical adjustability—to rake together the hay into wider and looser windrows, whereby there is a special turning effect on the hay. The farmer obtains from this process the advantage that the ground is subjected to a more intensified drying and the hay is laying more loosely on the ground.

By means of reversing the rotational direction of the rake wheel, i.e., similar turning of the rake wheels, it will be possible with the hay-gathering machine to produce a lateral windrow. Preferably, for this purpose the connection axle between the two rake-wheels of the hay-gathering machine should be placed in a slanted position towards the back. In order to fully utilize this advantage with regard to the working process given, the cam for pulling windrows should be rotated by the swivel axis and should be able to be adjusted for raking lateral windrows.

What I claim is:

1. In a hay-gathering machine for pulling windrows of hay and for turning and scattering the hay, comprising at least one rake-wheel rotating about a substantially vertical swivel axle, wherein rake tines are fastened on a plurality of the tine-carriers which are outwardly directed from said swivel axle, said tine-carriers being supported near the hub of the rake-wheel for rotation about their longitudinal axes and each being provided with a crank-like control lever which cooperatively engages a first control channel to control the rotational movement of the tine-carriers between a lowered and a raised position of the rake tines, the improvement comprising a second control channel is provided equidistantly about said swivel axle and means to adjust the relative position of said first and second control channels so that in a first position each said control lever contacts said first control channel and in a second position each said control lever is lifted from said first control channel and contacts said second control channel, said second control channel maintaining said tine-carriers in a substantially fixed position.

2. The hay machine according to claim 1, wherein each said control lever has a crank-type structure.

3. The hay machine according to claim 1 or 2, whereby spring means is provided for urging each said control lever into contact with said control channels.

4. The hay machine according to claim 1 or 2, wherein a guide way is provided parallel to and in cooperative relationship with said first control channel.

5. The hay machine according to claim 4, wherein said guide way comprises a disc element disposed about the swivel axle and a guide surface on said disc element facing said first control channel.

6. The hay machine according to claim 5, wherein said disc element is integral with a component part, said second control channel being on said component part.

7. The hay machine according to claim 1, wherein said first and second control channels are constructed as cams, the second control channel being planar in configuration.

8. The hay machine according to claim 1, wherein each said tine-carrier has a first and second control lever having a crank-like structure.

9. The hay machine according to claim 1 or 2, wherein said first and second control channels are each constructed as a cam and are identical and said second control channel is rotatable with regard to said swivel axle.

10. The hay machine according to claim 1, wherein said second control channel is located in a plane which is substantially perpendicular to said swivel axle and is adjustable in the longitudinal direction of the swivel axle.

11. The hay machine according to claim 10, wherein said second control channel is formed by the flange of a threaded bushing attached to a hollow axle disposed concentrically about said swivel axle, said hollow axle being rotatable.

12. The hay machine according to claim 10, wherein said first control channel comprises a surface area on a control member which is nonrotatably connected with a stationary housing portion and said second control channel is formed by the flange of a floating bushing which is slidably guided along a portion of the control member which is concentric to said swivel axle, and means to slectively fix the positions of said floating bushing.

13. The hay machine according to claim 12, wherein said means to selectively fix the position of said floating bushing comprises at least one rod extending through said control member and is connected at one end to said bushing, a lever pivotally mounted on said stationary housing and pivotally engaging the other end of said rod, said lever being pivotal in a plane which is parallel to said swivel axle and having a stop device.

14. The hay machine according to claim 10, wherein said first control channel is formed by a control member fixedly connected to said swivel axel, said second control channel being formed by a control disc supported for axial movement and guided by said swivel axel and means to adjust said control disc in selected positions.

15. The hay machine according to claim 10, wherein said control disc is pivotably connected to a lever by a rod linkage, said lever being pivotably connected to a support member fastened to said swivel axel, and is pivotable in a plane which is parallel to said swivel axle.

16. The hay machine according to claim 9, wherein said second control channel is formed by the flange of a control bushing mounted on a hollow axle, said hollow axle being concentrically disposed about said swivel axle and rotatable with respect thereto.

17. The hay machine according to claim 16, wherein said first control channel is formed by a control member fixedly connected against rotation with a stationary housing portion and said hollow axle is rotatably positioned in said control member and is secured in the selected positions.

18. The hay machine according to claim 9, wherein said first control channel is formed by a control member fixedly connected against rotation with respect to said swivel axle, and said second control channel is formed by a control disc rotatably on said swivel axle and means are provided for adjusting the position of said control disc.

19. The hay machine according to claim 9, wherein said second control channel is formed by a control member which is fixedly connected against rotation with respect to said swivel axle, and said first control channel is formed by a control disc rotatably positioned on said swivel axle and means is provided for securing it in selected positions.

20. The hay machine according to claim 1, wherein first and second control levers are provided on each tine-carrier and form an angle of less than 90°, and said first and second control channels face the same direction.

21. The hay-gathering machine according to claims 2 or 20, wherein said first and second control channels have varying diameters.

22. The hay-gathering machine according to claims 1, 2 or 20, wherein said tine-carriers are mounted for pivotable movement about a substantially horizontal axis perpendicular to their longitudinal axes.

23. A hay machine according to claim 8, wherein a bushing type control member having a flange at one end is slidably disposed coaxially about said swivel axel and said second control channel comprises a surface area on said flange, and means is provided for moving said control member between said positions.

24. A hay machine according to claim 1, wherein said means to adjust the relative position of said first and second control channels comprises a control bushing operably mounted coaxially about said swivel axle for axial displacement with respect thereto, means to axially displace said control bushing with respect to said swivel axle, and said second control channel comprising a cam surface on said control bushing operably positioned with respect to said first control channel so that in said first position said cam surface of said second control channel does not engage said control lever and in said second position produced by operating said means said cam surface engages said control lever.

* * * * *